United States Patent
Tsuji

(10) Patent No.: US 9,607,363 B2
(45) Date of Patent: Mar. 28, 2017

(54) PROJECTOR, TRAPEZOIDAL DISTORTION CORRECTION METHOD, AND STORAGE MEDIUM STORING TRAPEZOIDAL DISTORTION CORRECTION PROGRAM

(71) Applicant: Shigekazu Tsuji, Tokyo (JP)

(72) Inventor: Shigekazu Tsuji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 447 days.

(21) Appl. No.: 13/897,606

(22) Filed: May 20, 2013

(65) Prior Publication Data

US 2013/0335451 A1 Dec. 19, 2013

(30) Foreign Application Priority Data

Jun. 19, 2012 (JP) ................. 2012-137735

(51) Int. Cl.
  G06T 5/00 (2006.01)
  G03B 21/14 (2006.01)
  H04N 9/31 (2006.01)

(52) U.S. Cl.
  CPC .......... *G06T 5/006* (2013.01); *H04N 9/3185* (2013.01); *H04N 9/3194* (2013.01); *G03B 21/145* (2013.01); *G06T 5/00* (2013.01)

(58) Field of Classification Search
  None
  See application file for complete search history.

(56) References Cited

U.S. PATENT DOCUMENTS

2003/0223048 A1* 12/2003 Kimura .................. G03B 21/00
                                                    353/70
2005/0024598 A1   2/2005 Inoue
(Continued)

FOREIGN PATENT DOCUMENTS

CN    1445987 A    10/2003
CN    1885147 A    12/2006
(Continued)

OTHER PUBLICATIONS

Combined Office Action and Search Report issued on Feb. 3, 2016 in Chinese Patent Application No. 201310254885.3 with English translation of category of cited documents.

(Continued)

*Primary Examiner* — Said Broome
*Assistant Examiner* — Yu-Jang Tswei
(74) *Attorney, Agent, or Firm* — Oblon, McClelland, Maier & Neustadt, L.L.P.

(57) ABSTRACT

A projector includes a projection unit to project an image on a screen; an angle detector to detect shaking of the projection unit; and a trapezoidal distortion correction unit to conduct automatic trapezoidal distortion correction of the image displayed on the screen based on an inclination angle of the projection unit detected by the angle detector, and to enable manual trapezoidal distortion correction of the image displayed on the screen. When the manual trapezoidal distortion correction is conducted after the automatic trapezoidal distortion correction, the trapezoidal distortion correction unit determines whether an angle deviation of the inclination angle exceeds for a given threshold angle for a given time period. When the trapezoidal distortion correction unit determines that the angle deviation exceeds the given threshold angle, the automatic trapezoidal distortion correction is conducted again.

6 Claims, 5 Drawing Sheets

(56) References Cited

U.S. PATENT DOCUMENTS

| | | | |
|---|---|---|---|
| 2005/0237492 A1 | 10/2005 | Shinozaki | |
| 2010/0103386 A1* | 4/2010 | Kubota | H04N 9/3185 353/70 |
| 2012/0105813 A1* | 5/2012 | Todoroki | H04N 9/3194 353/69 |
| 2013/0107227 A1 | 5/2013 | Tsuji et al. | |
| 2013/0107228 A1 | 5/2013 | Tsuji et al. | |
| 2014/0066127 A1* | 3/2014 | Naiki et al. | 455/556.1 |

FOREIGN PATENT DOCUMENTS

| | | |
|---|---|---|
| CN | 101989028 A | 3/2011 |
| CN | 102196223 A | 9/2011 |
| JP | 2002-268142 A | 9/2002 |
| JP | 2010-136327 | 6/2010 |
| JP | 2011-217403 | 10/2011 |

OTHER PUBLICATIONS

Extended European Search Report issued Dec. 10, 2015 in Patent Application No. 13171540.1.
Chinese Office Action issued Sep. 29, 2016, in Chinese Patent Application No. 201310254885.3.

* cited by examiner

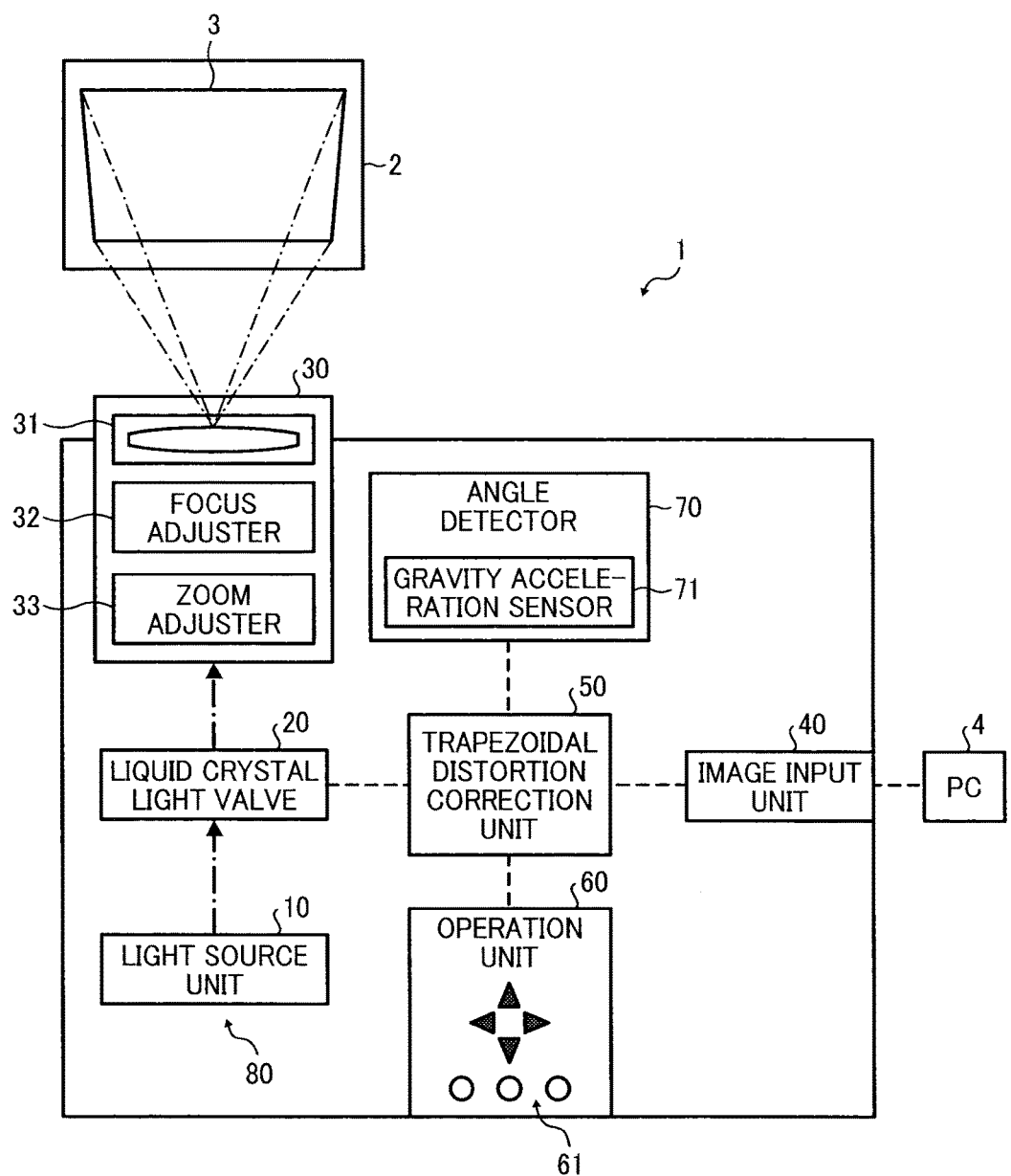

PROJECTOR, TRAPEZOIDAL DISTORTION CORRECTION METHOD, AND STORAGE MEDIUM STORING TRAPEZOIDAL DISTORTION CORRECTION PROGRAM

CROSS-REFERENCE TO RELATED APPLICATION

This application claims priority pursuant to 35 U.S.C. §119 to Japanese Patent Application No. 2012-137735, filed on Jun. 19, 2012 in the Japan Patent Office, the disclosure of which is incorporated by reference herein in its entirety.

BACKGROUND

Technical Field

The present invention generally relates to a projector having a trapezoidal distortion correction capability, a trapezoidal distortion correction method, and a trapezoidal distortion correction program stored in a storage medium or a carrier medium.

Background Art

Projectors for projecting images have an automatic trapezoidal distortion correction capability or automatic keystone distortion correction capability. When images are projected onto a screen from the projectors, a vertical trapezoidal distortion of the projected image can be detected and the image can be automatically corrected depending on an installation angle of the projectors. The automatic trapezoidal distortion correction capability can be executed by pressing a button.

This type of projector is configured with, for example, a projection unit, a gravity acceleration sensor, and a trapezoidal distortion correction unit. The gravity acceleration sensor detects an installation angle or inclination angle of the projector, the trapezoidal distortion correction unit corrects trapezoidal distortion of the projected image, and the projection unit projects a corrected image onto the screen.

However, with a short throw projector such as an ultra short throw projector having a short focus distance, the inclination angle of the projector affects the projected image quality. For example, when the ultra short throw projector projects an 80-inch image onto a screen from a 400-mm distance while inclined at a 0.3 degree angle, the top of the projected image is about 1794.5 mm long while the bottom of the projected image becomes about 1771.1 mm long. Therefore, the projected image has a trapezoidal distortion corresponding to the difference between the top and bottom lengths, which is 23.4 mm.

The correction performance of the automatic trapezoidal distortion correction capability depends on the resolution level of the gravity acceleration sensor disposed in the projector. For example, a relatively less expensive gravity acceleration sensor has a resolution level of 0.1 degree. But for the ultra short throw projector, a higher resolution level (or a minimum detection angle) is required for the angle detection to project an image within an area of a screen. For example, if the ultra short throw projector inclined 0.3 degree projects an image onto the screen, a higher resolution level such as resolution of 0.1 degree or less is preferable.

Fine adjustment that cannot be conducted automatically can be conducted manually. For example, correction in a range of 0 to 0.3 degree may be conducted manually in steps of, for example, 0.01 degree, which the automatic trapezoidal distortion correction function cannot handle.

In this case, trapezoidal distortion is corrected both automatically and manually, and therefore it is preferable to maintain the corrected condition after manual trapezoidal distortion correction has been conducted.

Further, when the projector is moved, the focus distance and installation angle may change, and the distance and angle change may affect trapezoidal distortion of the projected image. Therefore, it is preferable that automatic trapezoidal distortion correction be conducted once again.

When the projector is moved, resetting of the installation angle by automatic trapezoidal distortion correction can be conducted without pressing a button. Specifically, as disclosed in JP-4831219-B (JP-2010-136327-A), each time the projector is moved, a current automatic trapezoidal distortion correction is cancelled, and then a new automatic trapezoidal distortion correction is automatically conducted. A user is not required to operate the operation button when the projector is moved to enhance user friendliness.

However, for the projector disclosed in JP-4831219-B (JP-2010-136327-A), the trapezoidal distortion correction condition may not be cancelled effectively. For example, when an angular velocity sensor of the projector detects an angular velocity exceeding a threshold value, it is automatically determined that the projector is moved, and the current trapezoidal distortion correction condition is automatically cancelled. Therefore, even if shaking occurred on a desk placing the projector is little and the shaking does not affect a trapezoidal distortion of a projected image, the shaking is detected as a movement of the projector, and the current trapezoidal distortion correction is automatically cancelled and a new trapezoidal distortion correction is automatically conducted again.

As described above, the manual trapezoidal distortion correction may be conducted by a user in addition to the automatic trapezoidal distortion correction of a fine adjustment of trapezoidal distortion correction. If a unnecessary trapezoidal distortion correction is conducted again, the user needs to conduct the manual trapezoidal distortion correction again, which is not user friendly.

SUMMARY

In one aspect of the present invention, a projector is devised. The projector includes a projection unit to project and display an image on a screen disposed substantially vertically; an angle detector to detect shaking of the projection unit; and a trapezoidal distortion correction unit, using a processing circuit, to conduct automatic trapezoidal distortion correction of the image displayed on the screen based on an inclination angle of the projection unit detected by the angle detector, and to enable manual trapezoidal distortion correction of the image displayed on the screen. When manual trapezoidal distortion correction is conducted after automatic trapezoidal distortion correction, the trapezoidal distortion correction unit determines whether an angle deviation occurs to the inclination angle, set by the manual trapezoidal distortion correction, exceeding a given threshold angle for a given time period. When the trapezoidal distortion correction unit determines that the angle deviation exceeds the given threshold angle, the automatic trapezoidal distortion correction is conducted again.

In another aspect of the present invention, a method of correcting trapezoidal distortion of an image projected by a projector is devised. The projector includes a projection unit to project and display an image onto a screen disposed substantially vertically; an angle detector to detect shaking of the projection unit; and a trapezoidal distortion correction unit, using a processing circuit, to conduct automatic trapezoidal distortion correction of the image displayed on the screen based on an inclination angle of the projection unit detected by the angle detector, and to enable manual trapezoidal distortion correction of the image displayed on the screen. The method comprising the steps of: 1) correcting trapezoidal distortion automatically using the trapezoidal distortion correction unit; 2) correcting trapezoidal distortion manually using the trapezoidal distortion correction unit after correcting trapezoidal distortion automatically in step 1); 3) determining, using the trapezoidal distortion correction unit, whether an angle deviation occurs to the inclination angle, set by the manual trapezoidal distortion correction in step 2), exceeding a given threshold angle for a given time period; and 4) correcting trapezoidal distortion automatically again using the trapezoidal distortion correction unit upon determining that the angle deviation exceeds the given threshold angle in step 3).

In another aspect of the present invention, a non-transitory computer-readable storage medium storing a program that, when executed by a computer, causes the computer to execute a method of correcting a trapezoidal distortion of an image projected by a projector is devised. The projector includes a projection unit to project and display an image onto a screen disposed substantially vertically; an angle detector to detect shaking of the projection unit; and a trapezoidal distortion correction unit, using a processing circuit, to conduct automatic trapezoidal distortion correction of the image displayed on the screen based on an inclination angle of the projection unit detected by the angle detector, and to enable manual trapezoidal distortion correction of the image displayed on the screen. The method comprising the steps of: 1) correcting trapezoidal distortion automatically using the trapezoidal distortion correction unit; 2) correcting trapezoidal distortion manually using the trapezoidal distortion correction unit after correcting trapezoidal distortion automatically in step 1); 3) determining, using the trapezoidal distortion correction unit, whether an angle deviation occurs to the inclination angle, set by the manual trapezoidal distortion correction in step 2), exceeding a given threshold angle for a given time period; and 4) correcting trapezoidal distortion automatically again using the trapezoidal distortion correction unit upon determining that the angle deviation exceeds the given threshold angle in step 3).

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 illustrates a block diagram of a projector according to an example embodiment of the present invention;

FIG. 2 illustrates a relationship of an image generated on an image generator of a liquid crystal light valve and an image displayed on the screen, in which

FIG. 3 illustrates a relationship of a minimum angle and a projection distance of a projector, in which

FIG. 4 illustrates a detection scheme of an installation angle of the projector according to an example embodiment of the present invention, in which

Figure 2A:
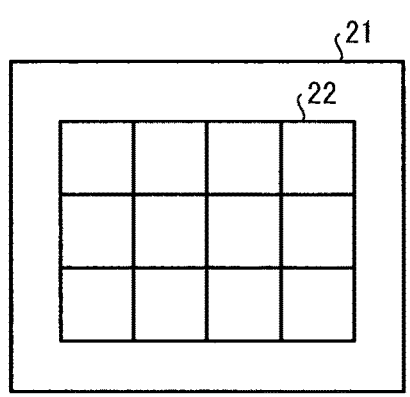
FIG. 2A is an rectangular shape image generated on the image generator.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that, have a similar function, operate in a similar manner, and achieve a similar result. Referring now to the drawings, apparatuses or systems according to example embodiment are described hereinafter.

A description is given of a projector 1 according to an example embodiment of the present invention. The projector 1 employs, for example, a liquid crystal display system using a liquid crystal light valve, but other systems can be employed. For example, the projector 1 can employ a projection system using a digital micro mirror device (DMD: registered trademark) using a digital light processing (DLP: registered trademark).

As shown in FIG. 1, the projector 1 includes, for example, a projection unit 80, an image input unit 40, a trapezoidal distortion correction unit 50, an operation unit 60, and an angle detector 70.

The projection unit 80 includes, for example, a light source unit 10, a liquid crystal light valve 20, and a projection optical unit 30.

The light source unit 10 includes, for example, a light source lamp, and a deflection element that converts light emitted from the light source lamp to linear polarized light. The light source lamp is, for example, a halogen lamp, a metal-halide lamp, a high-pressure mercury vapor lamp, or a solid-state light source such as a laser and a light emitting diode (LED), but not limited thereto.

The liquid crystal light valve 20 includes an image generation unit 21 such as a liquid crystal display panel for generating an image 22, which is a to-be-project image. Based on information output from the trapezoidal distortion correction unit 50, the image 22 can be generated on the image generation unit 21 of the liquid crystal light valve 20. If no correction is conducted by the trapezoidal distortion correction unit 50, an image input from the image input unit 40 is generated on the image generation unit 21 of the liquid crystal light valve 20 as it is.

The projection optical unit 30 includes, for example, a lens unit 31, a focus adjuster 32, and a zoom adjuster 33. The focus adjuster 32 adjusts the focal point of projected image 3 displayed on a screen 2, and the zoom adjuster 33 enlarges or reduces a size of the projected image 3.

The light beam emitted from the light source unit 10 passes through the image generation unit 21 of the liquid crystal light valve 20, in which the light beam radiates the image 22 generated on the image generation unit 21. Then, the image 22 is projected from the projection optical unit 30 and displayed as the projected image 3 on the screen 2. The projection unit 80 projects the projected image 3 on the screen 2, which may be a screen extending in the vertical direction.

The image input unit 40 is used to input images output from an image outputting apparatus such as a personal computer (PC) 4. The image outputting apparatus may be, for example, the PC 4, a digital versatile disk (DVD) player, a video player, a television, or the like. Further, images can be input to the image input unit 40 via a network distribution.

The trapezoidal distortion correction unit 50 can be configured, for example, as a control unit. The control unit such as a processing circuit includes, for example, a central processing unit (CPU), a read only memory (ROM) to store programs used for given processing, a random access memory (RAM) to store data temporarily, a backup memory, an input port, and an output port.

The ROM stores programs for executing the trapezoidal distortion correction by the trapezoidal distortion correction unit 50. The CPU runs the programs stored in the ROM using the RAM as a working memory area. Based on angle information input from the angle detector 70 or a correction instruction from the operation unit 60 instructing an adjustment of a correction amount, the trapezoidal distortion correction of images input from the image input unit 40 is conducted.

The trapezoidal distortion correction unit 50 can conduct an automatic trapezoidal distortion correction together with the gravity acceleration sensor 71. Specifically, based on an inclination angle X of the projection unit 80 in the upward and downward directions detected by the gravity acceleration sensor 71, the trapezoidal distortion correction unit 50 can conduct the automatic trapezoidal distortion correction of the projected image 3 displayed on the screen 2.

Figure 2B:
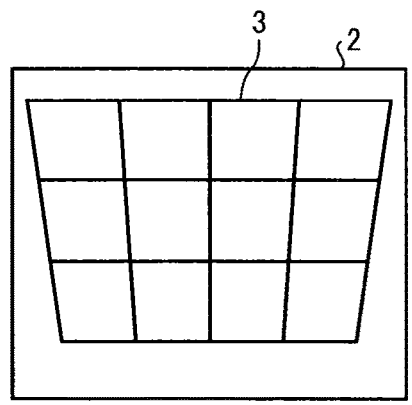
FIG. 2B is a trapezoidal image displayed on a screen.
Figure 2C:
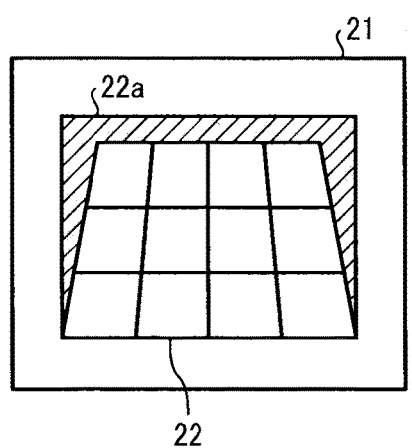
FIG. 2C is an image generated on the image generator after receiving a correction process.
Figure 2D:
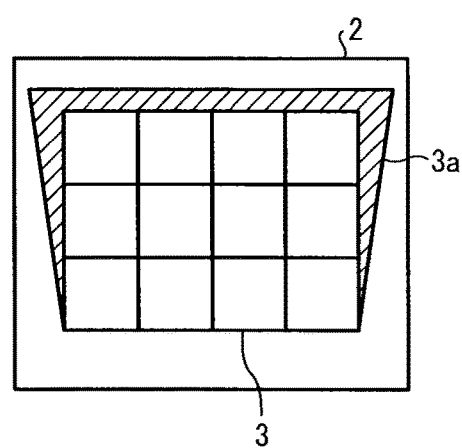
FIG. 2D is an image displayed on the screen after receiving the correction process.

When the image 22 having a rectangular shape is generated on the image generation unit 21 of the liquid crystal light valve 20 as shown in FIG. 2A, and the image 22 shown in FIG. 2A is projected onto the screen 2 with a tilted angle, the projected image 3 may become a distorted trapezoidal image as shown in FIG. 2B. To correct the trapezoidal distortion of the projected image 3, as shown in FIG. 2C, the trapezoidal distortion correction unit 50 sets black for a surrounding area 22a (shaded portion in FIG. 2C) of the image 22 of the image generation unit 21 of the liquid crystal light valve 20, wherein the surrounding area 22a is set depending on a value of the installation angle of the projector 1. The corrected image 22 is then projected onto the screen 2 with the tilted angle, by which a surrounding area 3a (shaded portion in FIG. 2D) is set around the rectangular projected image 3 as shown in FIG. 2D. With this configuration, the projected image 3 can be displayed as a rectangular image without distortion.

A minimum inclination angle that is required to be corrected is set for the trapezoidal distortion correction unit 50 as a minimum angle $\alpha$ in advance. If the projector 1 inclines greater than the minimum angle $\alpha$, the trapezoidal distortion correction unit 50 corrects the projected image 3. A specific value of the minimum angle $\alpha$ can be set depending on a projection distance L0. The minimum angle $\alpha$ can be referred to a threshold angle, which is used to determine whether the angle correction of the projector 1 is required.

Figure 3A:
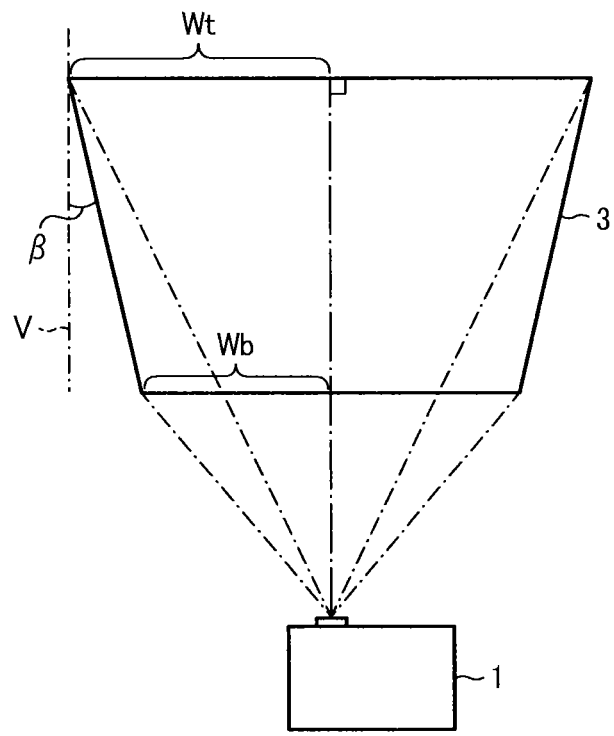
FIG. 3A shows a front view of an image displayed on a screen.
Figure 3B:
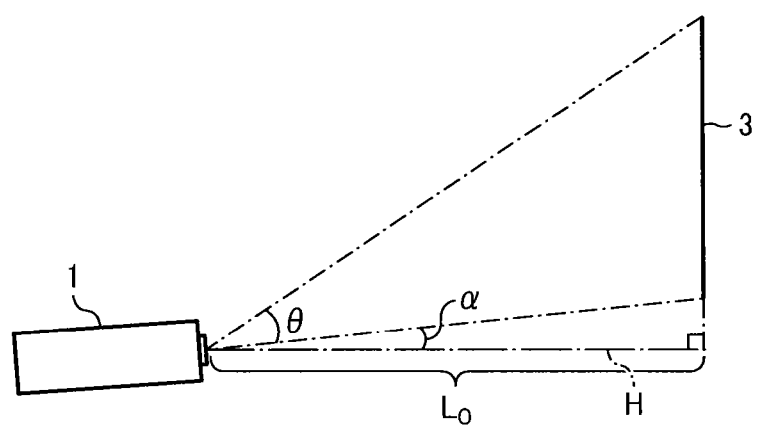
FIG. 3B shows a side view of an image displayed on a screen and the projector.

As shown in FIGS. 3A and 3B, the minimum angle $\alpha$ to be corrected by the trapezoidal distortion correction unit 50 can be computed using a following formula, in which $\alpha$ is the minimum angle, $\beta$ is the image distortion angle, Wt is one-half of the upper-side length of the projected image 3, Wb is one-half of the lower-side length of the projected image 3, $\theta$ is an image projection angle, and L0 is a projection distance, and a line V in FIG. 3A is the vertical line V and a line H in FIG. 3B is the horizontal line H.

$$\tan \beta = (Wt - Wb)/(L0 \times (\tan(\theta + \alpha) - \tan \alpha))$$

For example, if the trapezoidal distortion correction is required to be conducted for one step when a ratio of Wt/Wb deviates for fluctuates for 1%, the image distortion angle $\beta$ becomes 0.5 degree. For example, if the projection distance L0=400 mm is used under $\beta$=0.5 degree, the minimum angle $\alpha$ is computed about 0.3 degree. Further, if the projection distance L0=1200 mm is used under $\beta$=0.5 degree, the minimum angle $\alpha$ is computed about 0.7 degree.

As shown in FIG. 1, the operation unit 60 on the projector 1 includes, for example, a power switch and adjustment buttons 61. The adjustment buttons 61 include, for example, a button to zoom the projected image 3, a button to correct a distortion of the projected image 3, and a button to focus the projected image 3, and so on. The trapezoidal distortion correction of image can be conducted automatically by the trapezoidal distortion correction unit 50, and the trapezoidal distortion correction of image can be initiated by a manual operation of a user. For example, after automatically correcting the projected image 3 using the trapezoidal distortion correction unit 50, a user can conduct a fine adjustment or tuning of the trapezoidal distortion correction of the projected image 3.

The operation information of the operation unit 60 operated manually by a user can be output to the trapezoidal distortion correction unit 50. Then, based on the information input from the operation unit 60, the trapezoidal distortion correction unit 50 conducts a fine adjustment or tuning of trapezoidal distortion correction of the projected image 3. In an example embodiment in this disclosure, the manual trapezoidal distortion correction can be conducted, for example, with a unit of 0.01 degree. Therefore, if the inclination angle X is, for example, 0.35 degree, the trapezoidal distortion correction unit 50 automatically conducts the trapezoidal distortion correction for 0.3 degree, and the remaining 0.05 degree of the trapezoidal distortion can be corrected manually using the operation unit 60 with five steps (0.01×5) to conduct the fine tuning of the trapezoidal distortion correction. In an example embodiment, the trapezoidal distortion correction unit 50 can conduct a manual trapezoidal distortion correction together with the operation unit 60.

Further, the operation unit 60 can be disposed on the upper face of the projector 1 as described above, or a remote controller.

The angle detector 70 includes, for example, the gravity acceleration sensor 71. The gravity acceleration sensor 71 detects the installation angle of the projector 1. The angle information detected by the angle detector 70 is output to the trapezoidal distortion correction unit 50. Further, a resolution level of the gravity acceleration sensor 71 can be set, for example, 0.1 degree, which is an angle smaller than the minimum angle α set for the trapezoidal distortion correction unit 50.

The gravity acceleration sensor 71 outputs, for example, an analog voltage for acceleration occurred in one axis, but not limited to hereto. For example, the gravity acceleration sensor 71 can employ a sensor outputting a duty output, or a sensor that outputs voltage for two or three axes.

Figure 4A:
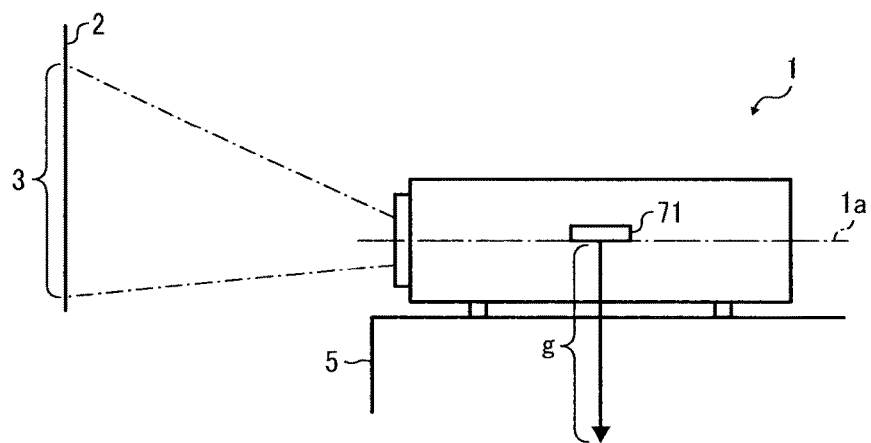
FIG. 4A illustrates a case that a projector is placed on a horizontal place.
Figure 4B:
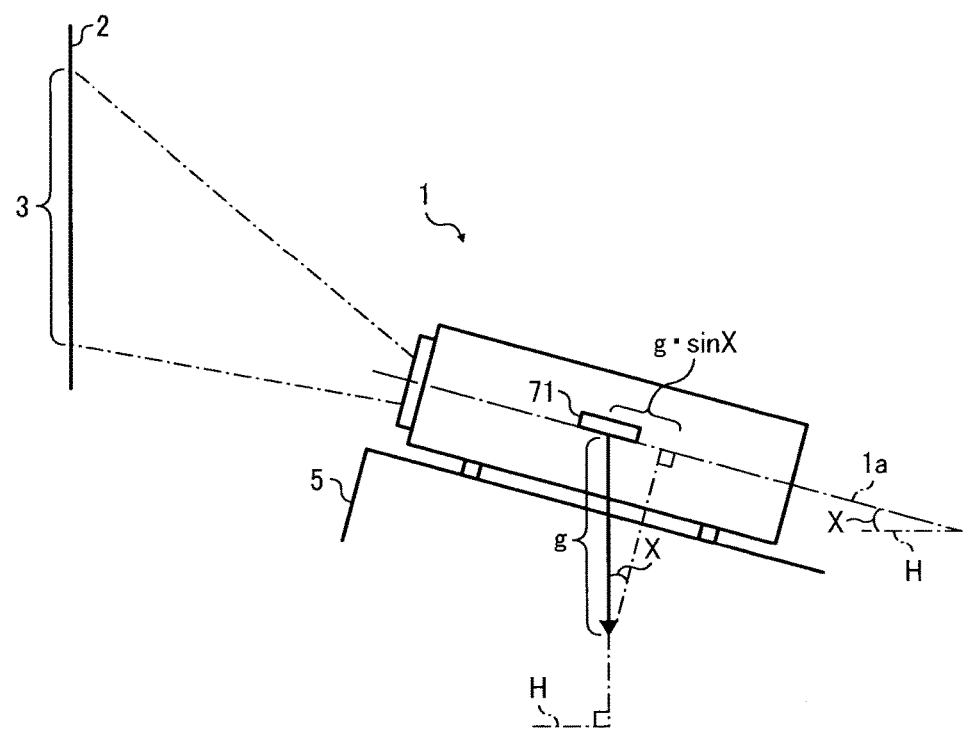
FIG. 4B illustrates a case that a projector is placed on a place with an inclined angle.

As shown in FIGS. 4A and 4B, the gravity acceleration sensor 71 is disposed, for example, in the projector 1. The gravity acceleration sensor 71 detects an acceleration movement occurring along, for example, a front-rear axis 1a of the projector 1.

As shown in FIG. 4A, if the projector 1 is placed on a upper face of a desk 5 set horizontally, a gravity acceleration occurs in the vertical downward direction, which means the acceleration does not occur along the front-rear axis 1a of the projector 1, by which the gravity acceleration sensor 71 outputs a value of zero.

As shown in FIG. 4B, if the desk 5 inclines with respect to the horizontal line H, the projector 1 projects an image with a tilted angle. If the inclination angle is X, an acceleration component in the rearward direction of the projector 1 becomes g·sin X, and the gravity acceleration sensor 71 outputs a voltage corresponding to the acceleration level. The angle detector 70 detects the installation angle of the projector 1 based on the voltage output from the gravity acceleration sensor 71.

As for the above described projector 1, the trapezoidal distortion correction automatically conducted by the trapezoidal distortion correction unit 50 may be referred as an automatic trapezoidal distortion correction, and the trapezoidal distortion correction manually conducted using the operation unit 60 may be referred as a manual trapezoidal distortion correction.

When the automatic trapezoidal distortion correction is conducted and then the manual trapezoidal distortion correction is conducted using the operation unit 60, the trapezoidal distortion correction unit 50 determines whether the angle deviation or fluctuation occurs to the inclination angle after the manual trapezoidal distortion correction exceeding a given threshold angle (e.g., 1 degree) or more for a given time (e.g., 1 second) or more set in advance. For example, after the manual trapezoidal distortion correction, if the angle deviation of one degree or more occurs to the inclination angle for one second or more, it is determined that the projector 1 is moved and placed on another place. The given time is not limited to one second but other value can be set. Further, the given threshold angle is not limited to one degree but other value can be set.

Only when the trapezoidal distortion correction unit 50 determines that the angle deviation occurs to the inclination angle exceeding the given threshold angle or more, the trapezoidal distortion correction unit 50 conducts the automatic trapezoidal distortion correction again. With this configuration, only when it is determined that the projector 1 is moved and placed to another place, the automatic trapezoidal distortion correction is conducted again.

In contrast, if it is determined that the projector 1 is not moved to another place, for example, if a minor vibration such as shaking or the like occurs to the desk 5 but the minor vibration does not affect the trapezoidal distortion of the projected image 3, the correction contents set by the manual trapezoidal distortion correction is maintained.

Figure 5:
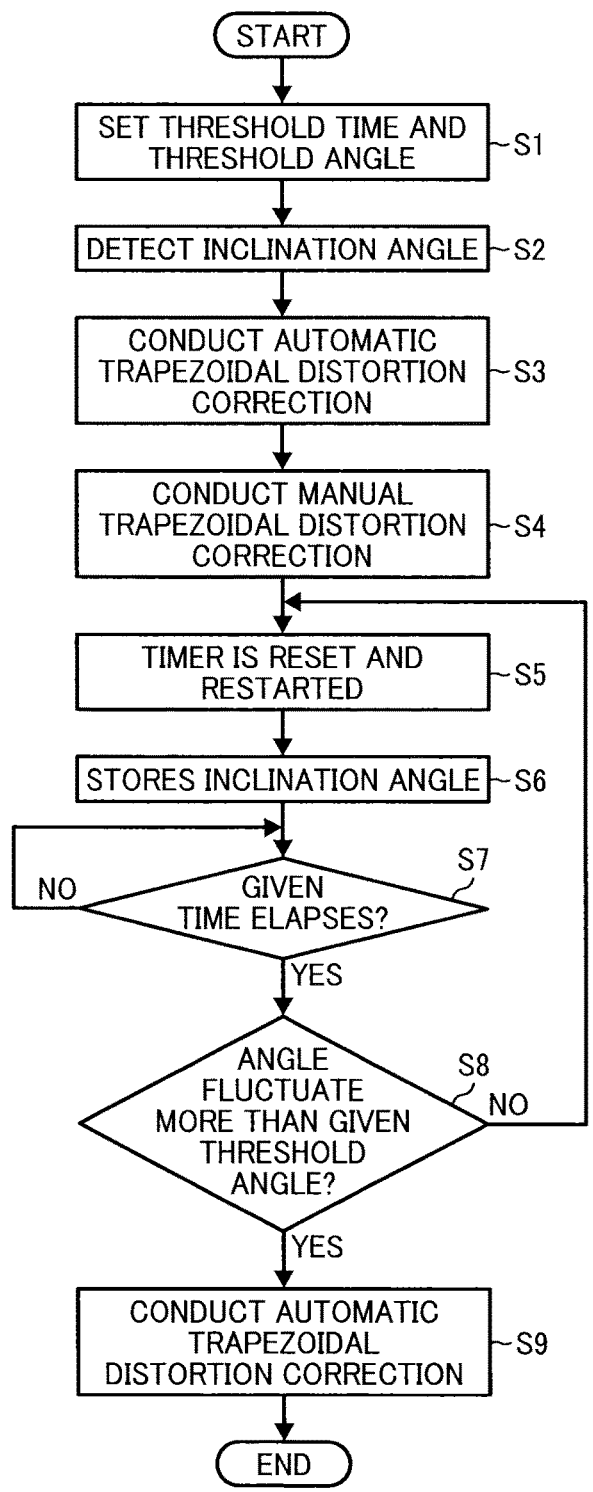
FIG. 5 is a flowchart of a process of correcting an installation angle of the projector.

A description is given of a process of the trapezoidal distortion correction for the projector 1 according to an example embodiment of the present invention with reference to FIG. 5, which is a flowchart of a process of correcting the trapezoidal distortion of a projected image.

As shown in FIG. 5, a threshold time and a threshold angle are set for the trapezoidal distortion correction unit 50 (step S1), in which the threshold time corresponds to the above given time such as one second, and the threshold angle corresponds to the above given threshold angle such as one degree.

Then, the trapezoidal distortion correction unit 50 detects the inclination angle X of the projector 1 using the gravity acceleration sensor 71 (step S2).

Then, the trapezoidal distortion correction unit 50 conducts the automatic trapezoidal distortion correction of the projected image 3 displayed on the screen 2 based on the inclination angle X of the projection unit 80 in the upward and downward directions detected by the gravity acceleration sensor 71 (step S3). For example, if the inclination angle X detected at step S2 is 0.35 degree, the automatic trapezoidal distortion correction is conducted for 0.3 degree.

Then, the trapezoidal distortion correction unit 50 conducts the manual trapezoidal distortion correction based on information input manually by a user via the operation unit 60 (step S4). For example, as described above, when the automatic trapezoidal distortion correction for 0.3 degree is conducted at step S3, and the adjustment of remaining 0.05 degree is manually conducted by the user, by which the trapezoidal distortion correction for 0.05 degree is manually adjusted.

Then, the trapezoidal distortion correction unit 50 resets and restarts a timer to measure a given time (step S5), which will be determined later at step S7

Then, upon completing the manual trapezoidal distortion correction, the trapezoidal distortion correction unit 50 stores the inclination angle in the RAM (step S6). For example, as described above, when the automatic trapezoidal distortion correction for 0.3 degree is conducted and then the manual trapezoidal distortion correction for 0.05 degree is conducted by the user, a value of 0.35 degree is stored in the RAM as the inclination angle after the manual trapezoidal distortion correction. In this case, the stored inclination angle is same as the inclination angle X detected by the gravity acceleration sensor 71. Further, the stored inclination angle may or may not be the same as inclination angle X detected by the gravity acceleration sensor 71. For example, if the inclination angle X is 0.35 degree, and 0.3 degree is corrected by the automatic trapezoidal distortion correction and 0.04 degree is corrected by the manual trapezoidal distortion correction, a value of 0.34 degree is stored as the inclination angle upon completing the manual trapezoidal distortion correction.

Then, the trapezoidal distortion correction unit 50 checks the timer measuring time to determine whether a given time (e.g., one second) elapses after restarting the timer (step S7). If the given time does not elapse (step S7: NO), step S7 is repeated until the given time elapses.

If the trapezoidal distortion correction unit 50 determines that the given time elapses after restarting the timer (step S7: YES), the trapezoidal distortion correction unit 50 determines whether the angle deviation or fluctuation occurs to the inclination angle exceeding a given threshold angle (e.g., one degree) or more set after the manual trapezoidal distortion correction (step S8).

If the trapezoidal distortion correction unit 50 determines that the angle deviation or fluctuation of the given threshold angle (e.g., one degree) or more does not occur to the inclination angle after the manual trapezoidal distortion correction (step S8: NO), the trapezoidal distortion correction unit 50 determines that the projector 1 is not moved to another place, the process returns to step S5, and the process of steps S5 to S8 is repeated. In this case, the fine tuned condition set by the automatic trapezoidal distortion correction and the manual trapezoidal distortion correction can be maintained.

In contrast, if the trapezoidal distortion correction unit 50 determines that the angle deviation occurs to the inclination angle exceeding the given threshold angle (e.g., one degree) after the manual trapezoidal distortion correction (step S8: YES), the trapezoidal distortion correction unit 50 determines that the projector 1 is moved to another place, and then the automatic trapezoidal distortion correction is conducted again (step S9).

The trapezoidal distortion correction method can use known methods to correct the image 22 generated on the image generation unit 21 of the liquid crystal light valve 20 using the trapezoidal distortion correction unit 50.

As described above, the projector 1 according to an example embodiment of the present invention can be configured as follows. When the manual trapezoidal distortion correction is conducted after the automatic trapezoidal distortion correction, it is determined whether the angle deviation occurs to the inclination angle exceeding the given threshold angle (e.g., one degree) or more after the manual trapezoidal distortion correction for a given time (e.g., one second) or more. Only when the angle deviation exceeds the given threshold angle or more, the automatic trapezoidal distortion correction is conducted again. With this configuration, the automatic trapezoidal distortion correction can be conducted again only when it is determined that the projector 1 is moved to another place. In the above described example embodiment, after conducting the automatic trapezoidal distortion correction and the manual trapezoidal distortion correction, the trapezoidal distortion correction can be conducted again only when the trapezoidal distortion correction is required. Therefore, for example, when the projector 1 is not moved and thereby the trapezoidal distortion of the projected image 3 on the screen 2 is not affected, the fine tuned condition set for the projected image 3 by the manual trapezoidal distortion correction can be maintained.

Further, a resolution level required for the trapezoidal distortion correction becomes high for a ultra short throw projector having a projection distance, for example, L0=0 to 800 mm, and a short throw projector having a projection distance, for example, L0=800 to 1200 mm, which means the trapezoidal distortion correction needs a higher resolution level. Therefore, the projector 1 according to an example embodiment of the present invention can be effectively applied to the ultra short throw projector and the short throw projector. Further, the projector 1 can be applied to a normal throw projector having a normal projection distance with the above described same effect.

In the above described example embodiment, the projector 1 employs the liquid crystal display system using the liquid crystal light valve 20 as a projection system. However, other systems can be employed for the projector 1. For example, the projector 1 can employ the DLP system using the DMD as a projection system. In the DLP system, white light emitted from a lamp is focused on the DMD using a lens, and the light reflected by the ON-state micro mirrors of the DMD is enlarged by other lens, and projected onto a screen.

In the above described example embodiment projector and trapezoidal distortion correction, when the automatic trapezoidal distortion correction and the manual trapezoidal distortion correction are conducted, the trapezoidal distortion correction is conducted again only when it is determined that the trapezoidal distortion correction is required.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. A projector, comprising:
    correction circuitry to conduct automatic trapezoidal distortion correction of an image displayed on a screen disposed vertically based on an inclination angle of a projection unit detected by an angle detector, and to enable manual trapezoidal distortion correction of the image displayed on the screen based on a physical setting of the inclination angle of the projection unit,
    wherein, after the manual trapezoidal distortion correction is conducted subsequent to the automatic trapezoidal distortion correction, the automatic trapezoidal distortion correction is not conducted again using the correction circuitry, when a time period after conducting the manual trapezoidal distortion correction is within a given time period, and when a detected angle deviation from the set inclination angle of the projection unit for the manual trapezoidal correction is at or below a threshold inclination angle, and
    wherein, after the manual trapezoidal correction is conducted subsequent to the automatic trapezoidal distortion correction, the automatic trapezoidal distortion correction is conducted again based on the detected angle deviation, using the correction circuitry, when a time period after conducting the manual trapezoidal distortion correction exceeds the given time period, and when the detected angle deviation is greater than the threshold inclination angle.

2. The projector of claim 1,
    wherein, when the manual trapezoidal distortion correction is conducted after the automatic trapezoidal distortion correction, the correction circuitry determines whether the detected angle deviation occurs to the inclination angle for at least one degree or more as the threshold inclination angle for at least one second or more as the given time period, and
    wherein, upon the correction circuitry determining that the angle deviation of at least one degree or more occurs to the inclination angle, the correction circuitry conducts the automatic trapezoidal distortion correction again.

3. The projector of claim 1, further comprising the angle detector, wherein the angle detector is a gravity acceleration sensor.

4. A method of correcting trapezoidal distortion of an image projected by a projector including a projection unit to project and display an image onto a screen disposed vertically; an angle detector to detect shaking of the projection unit; and correction circuitry to conduct automatic trapezoidal distortion correction of the image displayed on the screen based on an inclination angle of the projection unit detected by the angle detector, and to enable manual trapezoidal distortion correction of the image displayed on the screen based on a physical setting of the inclination angle of the projection unit, the method comprising:
    correcting trapezoidal distortion automatically using the correction circuitry;
    correcting trapezoidal distortion manually using the correction circuitry after said correcting trapezoidal distortion automatically; and
    after said correcting trapezoidal distortion manually, determining whether a time period after said correcting trapezoidal distortion manually is within a given time period, and determining whether a detected angle deviation from a set inclination angle of the projection unit for said correcting trapezoidal distortion manually exceeds a threshold inclination angle, using the correction circuitry,
    wherein said correcting trapezoidal distortion automatically is not conducted again using the correction circuitry when the time period after said correcting trapezoidal distortion manually is within the given time period, and when the detected angle deviation is at or below the threshold inclination angle, and
    wherein said correcting trapezoidal distortion automatically is conducted again, based on the detected angle deviation, using the correction circuitry, when the time period after conducting the manual trapezoidal distortion correction exceeds the given time period, and when the detected angle deviation is greater than the threshold inclination angle.

5. The method of claim 4,
    wherein, when after said correcting trapezoidal distortion manually is conducted, the correction circuitry determines whether the detected angle deviation occurs to the inclination angle for at least one degree or more as the threshold inclination angle for at least one second or more as the given time period, and
    wherein, upon determining that the angle deviation of at least one degree or more occurs, the correction circuitry conducts said correcting trapezoidal distortion automatically again.

6. A non-transitory computer-readable carrier medium storing a program that, when executed by a computer, causes the computer to execute a method of correcting trapezoidal distortion of an image projected by a projector including a projection unit to project and display an image onto a screen; an angle detector to detect shaking of the projection unit; and correction circuitry to conduct automatic trapezoidal distortion correction of the image displayed on the screen based on an inclination angle of the projection unit detected by the angle detector, and to enable manual trapezoidal distortion correction of the image displayed on the screen based on a physical setting of the inclination angle of the projection unit, the method comprising:

correcting trapezoidal distortion automatically using the correction circuitry;
correcting trapezoidal distortion manually using the correction circuitry after said correcting trapezoidal distortion automatically; and
after said correcting trapezoidal distortion manually, determining whether a time period after said correcting trapezoidal distortion manually is within a given time period, and determining whether a detected angle deviation from a set inclination angle of the projection unit for said correcting trapezoidal distortion manually exceeds a threshold inclination angle,
wherein said correcting trapezoidal distortion automatically is not conducted again when the time period after said correcting trapezoidal distortion manually is within the given time period, and when the detected angle deviation is at or below the threshold inclination angle, and
wherein said correcting trapezoidal distortion automatically is conducted again, based on the detected angle deviation, when the time period after conducting the manual trapezoidal distortion correction exceeds the given time period, and when the detected angle deviation is greater than the threshold inclination angle.

* * * * *